A. T. Latta,
Cage Trap,
Nº 79,987. Patented July 14, 1868.
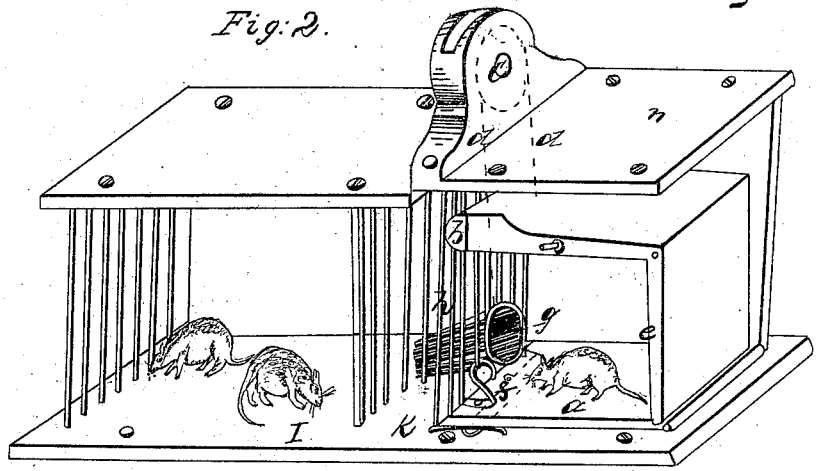
Fig. 2.
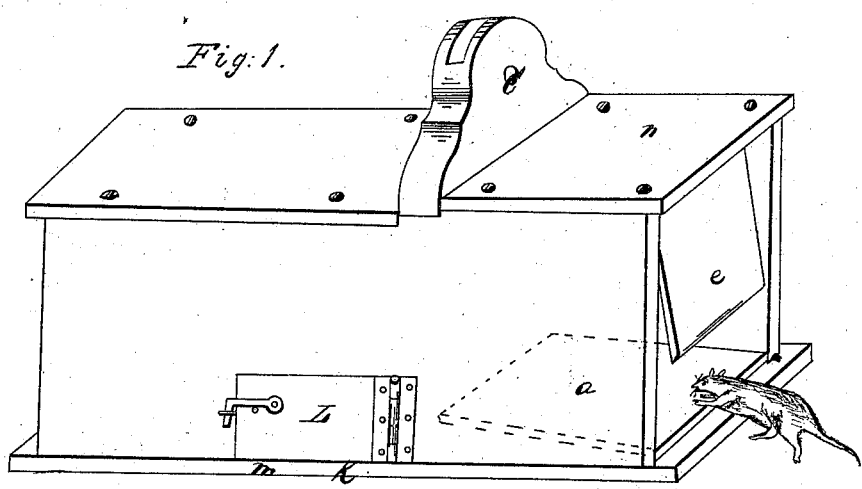
Fig. 1.
Fig. 3.
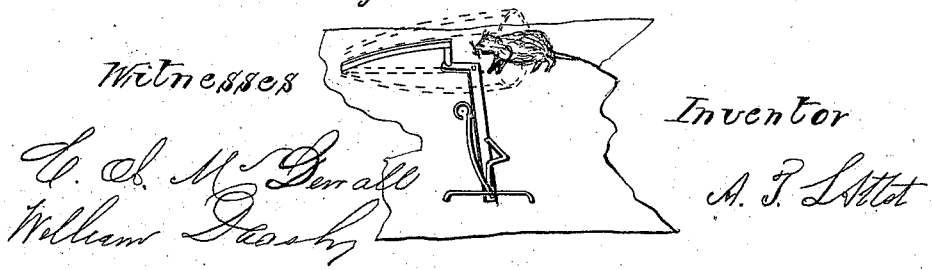
Witnesses
Inventor
A. T. Latta

United States Patent Office.

A. T. LATTA, OF CAMDEN, SOUTH CAROLINA.

Letters Patent No. 79,987, dated July 14, 1868.

IMPROVED ANIMAL AND BIRD-TRAP.

The Schedule referred to in these Letters Patent and making part of the same.

This invention relates to certain Improvements in Animal-Traps, and consists principally in the combination of a pivoted and weighted door with a hinged platform, the two being nearly balanced and connected by a cord passing over a pulley, the operation of springing the trap being performed by the balance being disturbed by the weight of the animal; also, in certain devices for resetting the trap; all of which will be fully described hereinafter.

Figure 1 represents a perspective view of my trap when set.

Figure 2, a perspective view when sprung, with the side removed; and

Figure 3 a perspective view of the resetting-devices.

In the drawings, $e$ represents the door, which is suitably located in the open end of the trap, as shown, the upper part of which is pivoted in such manner as to permit the front and lower part to be elevated when the rear end of the upper part is depressed.

To depress the rear end of the upper part, the door is heavily weighted at $b$, by which means it is kept always open when undisturbed. To provide for its closing, however, for the purpose of entrapping the animal, I have provided the hinged platform $a$, which is connected to the rear end of door $e$ by means of the cord $d$ passing over pulley $c$.

The cord $d$ is of such length that when the door $e$ occupies its natural position, and is open, the rear end of platform $a$ is elevated. This platform $a$ nearly balances the door $e$.

It will be observed that the trap is divided into three distinct parts, the entrance-chamber, the rear chamber I, and the bait-chamber K.

$g$ represents a wire barrel communicating between the front and rear chambers, upon one side of which is the arm $h$, as shown in fig. 3.

This arrangement is rigidly attached to the bent lever, upon which is the catch $f$. This catch is ordinarily kept in place by means of a spring placed in rear of it. When, however, the arm $h$ is pushed to one side, the catch $f$ is necessarily drawn back. This catch springs into a notch in the platform $a$, when the latter is depressed, and holds it firmly down.

L represents a door in the side of the trap, which opens into chambers I and K, and is so arranged that when shut the chambers are entirely separate.

K is a small chamber in which the bait is enclosed and secured from being eaten.

The operation of my trap is as follows:

The bait having been placed in the chamber K is in full view through the open door of the trap. An animal attracted thereby, upon entering and passing to the rear of platform $a$ for the purpose of securing it, disturbs the balance and causes the rear end of the platform to fall, by which means the weighted end of door $e$ is pulled up and the trap closed. The platform, when down, is caught and securely held by the catch $f$. The frightened animal now, seeking a way of escape, passes through the only opening, the barrel $g$, which is exposed by the fall of the platform. In passing through this, however, the animal must press against the arm $h$, by which means the catch $f$ is thrown back and the platform $a$ released, which latter is immediately drawn up by the weighted end of door $e$, and the trap thus reset.

The operation herein described may be repeated an indefinite number of times, being limited only by the capacity of the trap.

This trap may be adapted to birds by constructing it of slats.

Having thus fully described my invention, what I claim as new, and desire to secure by Letters Patent, is—

1. The weighted and pivoted door $e$, cord $d$, pulley $c$, platform $a$, and catch $f$, all constructed as described, and combined and operated in the manner set forth.

2. In combination with the above, barrel $g$, arm $h$, bent lever and catch $f$, the whole being operated in the manner and for the purpose set forth.

A. T. LATTA.

Witnesses:
M. D. PASS,
ROB'T LATTA.